July 19, 1932. H. HAALCK 1,868,010
TORSION BALANCE
Filed July 31, 1926
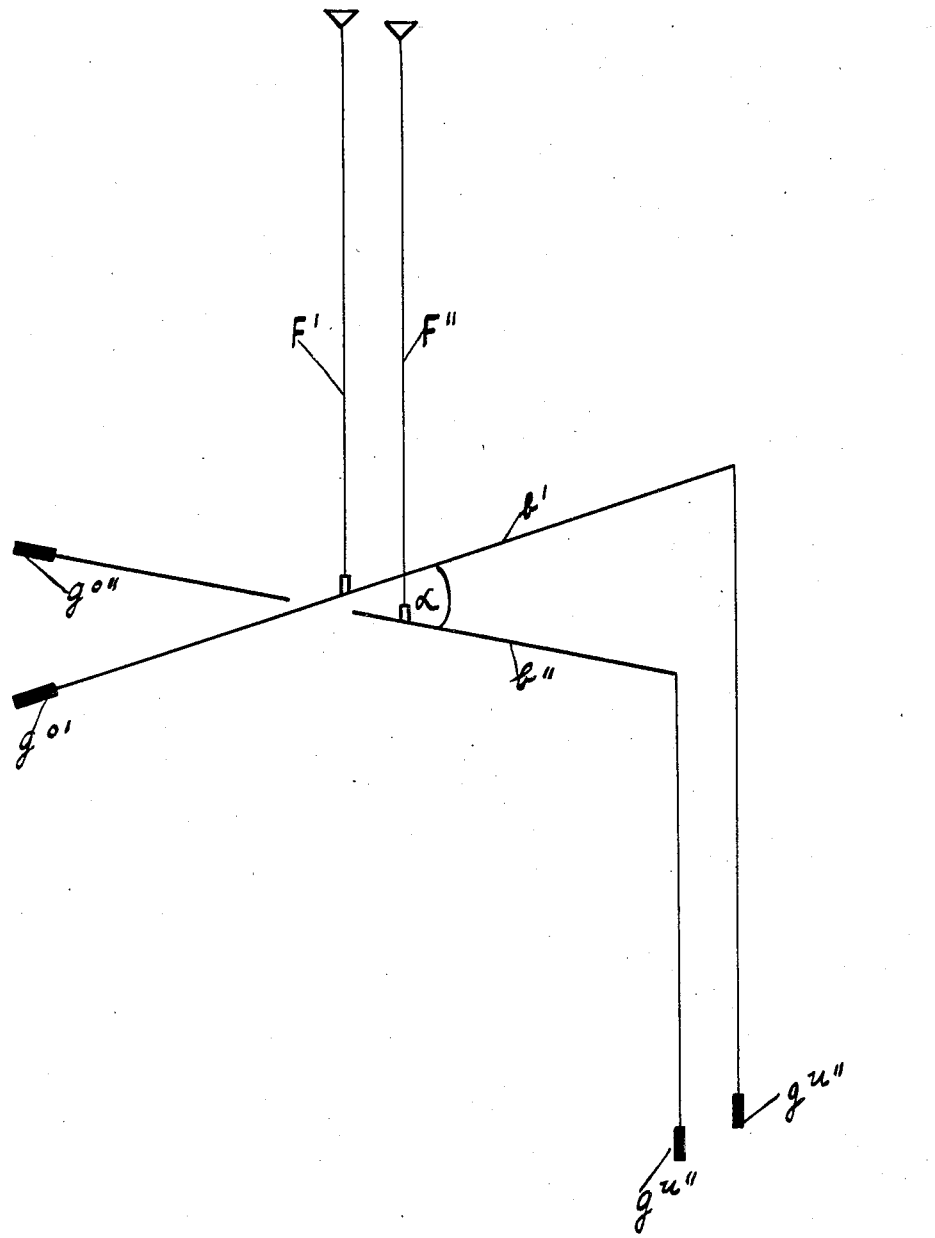
Inventor.
Hans Haalck.
per [signature]
Attorney.

Patented July 19, 1932

1,868,010

UNITED STATES PATENT OFFICE

HANS HAALCK, OF BERLIN-STEGLITZ, GERMANY, ASSIGNOR TO THE FIRM: EXPLORATION BODENUNTERSUCHUNGS & VERUERTUNGS, G. M. B. H., OF BERLIN, GERMANY

TORSION BALANCE

Application filed July 31, 1926, Serial No. 126,187, and in Germany December 22, 1925.

The accompanying drawing shows, by way of example, a view of an apparatus for carrying out the invention. In the drawing $b'$ and $b''$ designate the two beams of the torsion balance, which hang at the torsion threads $F'$ and $F''$ and which bear at their one ends upper weights $g^{o'}$, $g^{o''}$ and at the opposite ends lower weights $g^{u'}$, $g^{u''}$ hanging at threads. The angle formed by the two beams is preferably of 90°.

The Eötvös torsion balance consists of a horizontal rod which, at a small projection at about the center, is suspended by a thin thread. At one end of the rod there is a weight while at the other end there is a second weight of about the same size suspended by a thread. With this torsion balance one determines, as is shown in the well-known paper by Eötvös which appeared in the publications of the Zentralbüros der Internationalen Erdmessung (Central Office of the International Earth Measurements), Budapest, 1906, the horizontal gradients of gravity and the so-called magnitudes of curvature of the niveau surfaces at the individual measuring points. Of these two values the first are of special importance in practical geophysics, because by their determination it is possible to draw conclusions as to the structure of deposits, geological formations, and the like.

If one uses a torsion balance with a pendulum of the type described, it is necessary to measure the equilibrium position of the pendulum in five different azimuths in succession. In order to shorten this long process, since the time of Eötvös it has been customary to build in each instrument two pendulums which are at an angle of 180° to each other, that is, they are so arranged that the beams are parallel, but on each side the weight that is placed on one beam is above the weight that is suspended from the other beam. In the paper by Eötvös which is mentioned above, it is shown that by using this arrangement the magnitudes given above can be determined by measurements in three azimuth directions. It has already been proposed to obtain a further shortening of the measuring method by putting four pendulums in one instrument instead of two, so that two pairs of balances, each of which contains two pendulums at an angle of 180° to each other, are placed in such a manner that the pair form an angle of 60° with each other. With this arrangement the values mentioned can be determined by two observations.

According to the present invention a system is used which, like the Eötvös arrangement, consists only of two pendulums, but has the advantage over this arrangement, that by two measurements it is possible to determine the horizontal gradients of gravity. The pendulums are not placed at an angle of 180° to each other as with Eötvös, but, as can be seen from the figure, at an angle of about 90°. The manner in which the horizontal gradients of gravity can be determined by measurements in only two azimuths with this arrangement, can also be derived from the fundamental equations given in the work of Eötvös which was previously mentioned, and as a matter of fact, the result is that with the new arrangement the measurement must be carried out in two azimuths that are at an angle of 180° to each other. As this measurement requires from three quarters to one hour for each individual measurement, as compared with the method used by Eötvös in which three measurements are required in order to determine the gradients, a considerable technical advance is made, namely, a time saving of 50%.

If the curvature values are also to be determined with the new arrangement, it requires measurement in three azimuths as with the Eötvös arrangement. However, as the determination of the curvature value in general is not of great importance in practical geophysics in which the object is to locate underground deposits, the new arrangement can always be given preference over the old one in practical use.

That the arrangement forming the object of the invention has great advantages due to its great simplicity over the arrangement in which four pendulums must be used in order to effect a saving in time, requires no further explanation.

I claim:

1. A torsional balance of the Eötvös type in which two relatively closely spaced and corresponding hanging beams, each of which is entirely independently suspended with respect to the other, are arranged at an angle to each other instead of being relatively parallel.

2. A torsional balance of the Eötvös type in which two relatively closely spaced and corresponding hanging beams, each of which is entirely independently suspended with respect to the other, are arranged at an angle of about 90° instead of being relatively parallel.

3. A torsional balance of the Eötvös type in which two relatively closely spaced and corresponding hanging beams are each entirely independently suspended with respect to the other and are arranged at an angle to each other within 90° instead of being relatively parallel.

HANS HAALCK.